United States Patent

Mardjono et al.

(10) Patent No.: US 8,579,225 B2
(45) Date of Patent: Nov. 12, 2013

(54) DEVICE FOR ACOUSTIC TREATMENT OF THE NOISE EMITTED BY A TURBOJET

(75) Inventors: Jacky Novi Mardjono, Nogent sur Marne (FR); Jacques Michel Albert Julliard, Hericy (FR); Georges Jean Xavier Riou, Melun (FR)

(73) Assignee: SNECMA, Paris (FR)

( * ) Notice: Subject to any disclaimer, the term of this patent is extended or adjusted under 35 U.S.C. 154(b) by 145 days.

(21) Appl. No.: 13/267,327

(22) Filed: Oct. 6, 2011

(65) Prior Publication Data

US 2012/0085861 A1 Apr. 12, 2012

(30) Foreign Application Priority Data

Oct. 7, 2010 (FR) ...................................... 10 58148

(51) Int. Cl.
*B64C 1/40* (2006.01)

(52) U.S. Cl.
USPC ............... 244/1 N; 181/292; 181/288; 60/262

(58) Field of Classification Search
USPC ................... 244/1 N, 53 R, 53 B, 133, 129.1; 181/213, 214, 224, 286, 292; 60/226.1, 60/262
See application file for complete search history.

(56) References Cited

U.S. PATENT DOCUMENTS

| | | | | |
|---|---|---|---|---|
| 3,477,231 A | * | 11/1969 | Paulson | 60/269 |
| 4,235,303 A | * | 11/1980 | Dhoore et al. | 181/214 |
| 4,858,721 A | * | 8/1989 | Autie et al. | 181/213 |
| 5,060,471 A | * | 10/1991 | Torkelson | 60/262 |
| 5,167,118 A | * | 12/1992 | Torkelson | 60/226.1 |
| 5,478,199 A | * | 12/1995 | Gliebe | 415/119 |
| 5,824,973 A | * | 10/1998 | Haines et al. | 181/286 |
| 5,923,003 A | * | 7/1999 | Arcas et al. | 181/292 |
| 6,094,907 A | * | 8/2000 | Blackner | 60/226.1 |
| 6,811,372 B1 | * | 11/2004 | Emborg et al. | 415/119 |
| 6,827,180 B2 | * | 12/2004 | Wilson | 181/292 |
| 6,896,099 B2 | * | 5/2005 | Porte et al. | 181/214 |
| 7,540,354 B2 | * | 6/2009 | Morin et al. | 181/292 |
| 7,661,261 B2 | * | 2/2010 | Julliard et al. | 60/226.1 |
| 8,132,756 B2 | * | 3/2012 | Huber et al. | 244/53 R |

(Continued)

FOREIGN PATENT DOCUMENTS

| EP | 0 289 376 A1 | 11/1988 |
|---|---|---|
| EP | 1 849 987 A2 | 10/2007 |
| EP | 1 860 301 A2 | 11/2007 |

OTHER PUBLICATIONS

French Preliminary Search Report and Written Opinion issued Apr. 15, 2011, in French 1058148, filed Oct. 7, 2010 (with English Translation of Category of Cited Documents).

*Primary Examiner* — Christopher P Ellis
*Assistant Examiner* — Medhat Badawi
(74) *Attorney, Agent, or Firm* — Oblon, Spivak, McClelland, Maier & Neustadt, L.L.P.

(57) ABSTRACT

The invention provides a device for acoustical treatment of the noise emitted by a bypass turbojet comprising a primary cowl having in an outer surface an inner annular acoustic treatment panel and a secondary cowl including in an inner surface an outer annular acoustic treatment panel arranged facing the inner panel. The inner and outer panels include respective central panel portions facing each other and extending axially over a common predetermined length, the length of the central panel portions lying in the range one-fifth to four-fifths of the total length of the panels, and the ratio between the acoustic resistances of the central panel portions being not less than 2.

13 Claims, 3 Drawing Sheets

(56) References Cited

U.S. PATENT DOCUMENTS

| | | | |
|---|---|---|---|
| 8,157,050 B2* | 4/2012 | Huber et al. | 181/220 |
| 8,226,027 B2* | 7/2012 | Journade et al. | 244/54 |
| 8,333,344 B2* | 12/2012 | Vauchel et al. | 244/53 B |
| 8,336,804 B2* | 12/2012 | Hoetzeldt et al. | 244/1 N |
| 2002/0070077 A1* | 6/2002 | Porte et al. | 181/292 |
| 2003/0141144 A1* | 7/2003 | Wilson | 181/292 |
| 2006/0272886 A1* | 12/2006 | Mueller | 181/224 |
| 2007/0220894 A1* | 9/2007 | Bouty et al. | 60/770 |
| 2007/0251212 A1* | 11/2007 | Tester | 60/262 |
| 2007/0272483 A1* | 11/2007 | Morin et al. | 181/292 |
| 2008/0236137 A1* | 10/2008 | Julliard et al. | 60/226.1 |
| 2011/0142615 A1* | 6/2011 | Riou et al. | 415/220 |

* cited by examiner

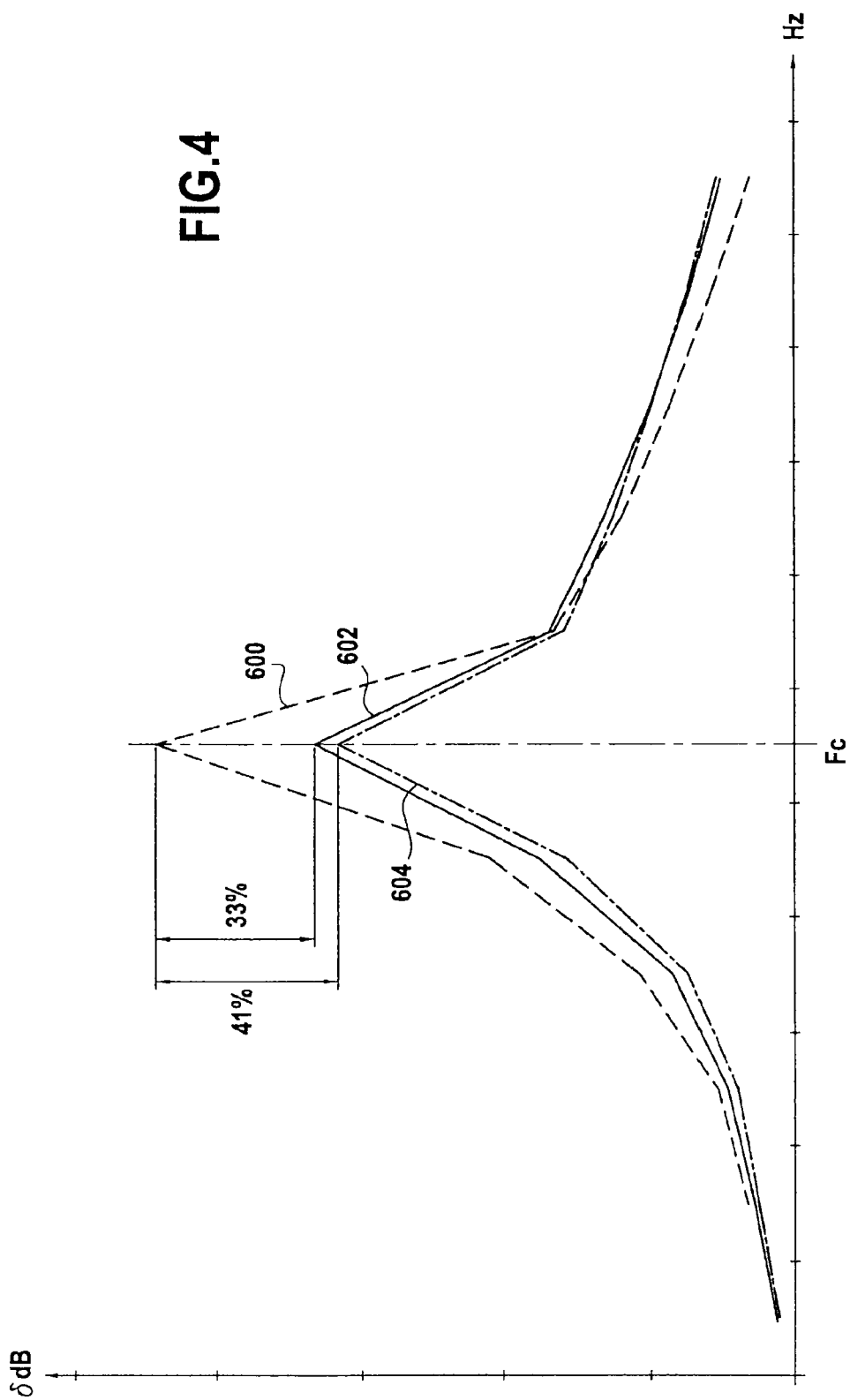

DEVICE FOR ACOUSTIC TREATMENT OF THE NOISE EMITTED BY A TURBOJET

BACKGROUND OF THE INVENTION

The present invention relates to the general field of passive acoustic treatment dedicated to reducing the noise emitted by an aircraft turbojet.

In the field of aviation, international and local regulations are becoming ever more severe concerning the sound nuisance produced by airplanes, and in particular the nuisance that can be attributed to turbojets. Engine manufacturers are thus being called on to reduce the noise from their turbojets, and in particular the fan noise that becomes the major component in the overall noise emitted by a turbojet.

Some reduction in the fan noise of the turbojet can be obtained by modifying the shape and the section stacks of the fan blades. Nevertheless, having recourse to passive acoustic treatment panels remains the main element capable of attenuating such noise. Such panels are usually arranged in the engine nacelle, e.g. downstream from the fan around the outer surface of the primary cowl and the inner surface of the secondary cowl. Such panels are generally made up of one or more layers, each formed by a core of cellular structure sandwiched between a solid skin and a perforated skin.

Furthermore, the present trend is to move turbojet designs towards engines having ever-greater bypass ratios so as to increase the thrust efficiency of such turbojets. Unfortunately, that trend leads to reducing the size of the nacelle, and thus to reducing the available area that can be treated acoustically with passive acoustic treatment panels. Having recourse to two-layer panels enables this reduction in the treated surface area to be compensated, in part. Nevertheless, such a solution is not fully satisfactory in terms of reducing sound emission.

OBJECT AND SUMMARY OF THE INVENTION

A main object of the present invention is to mitigate such drawbacks by proposing a passive acoustic treatment device that makes it possible to achieve effective attenuation of the noise emitted by a turbojet, in particular by its fan.

This object is achieved by a device for acoustically treating the noise emitted by a bypass turbojet, the device comprising: a primary cowl for surrounding the central core of the turbojet and including in an outer surface an internal annular acoustic treatment panel; and a secondary cowl surrounding the primary cowl to co-operate therewith to define an annular channel for passing a cold flow from the turbojet, the secondary cowl including in an inner surface of an outer annular acoustic treatment panel placed facing the inner panel and extending axially over the same length as the inner panel; and wherein, in accordance with the invention, the inner and outer panels include respective central panel portions facing each other and extending axially over a common predetermined length, the length of the central panel portions lying in the range one-fifth to four-fifths of the total length of the panels, and the ratio between the acoustic resistances of the central panel portions being not less than 2.

The invention thus provides for locally adapting the acoustic resistance of the central portions of the acoustic treatment panels to the characteristics of the sound source from which the noise originates. More precisely, the invention provides for subdividing the inner and outer panels and for creating asymmetry in terms of acoustic resistance between the central portions of the inner and outer panels in order to optimize the acoustic characteristics of these panel portions individually.

As a result, the noise leaving the acoustic treatment zone can be attenuated more strongly than is possible with panels presenting acoustic characteristics that remain uniform over their entire lengths. For constant treated surface areas, the acoustic treatment device of the invention thus makes it possible to increase acoustic attenuation at target frequencies by 20% to 40%. For constant acoustic attenuation, the acoustic treatment device of the invention makes it possible to reduce the bulk of the inner and outer panels.

Preferably, the ratio between the acoustic resistance of the outer central panel portion to the acoustic resistance of the inner central panel portion lies in the range 2 to 9.

Also preferably, the acoustic resistance of the inner central panel portion lies in the range $0.3\,\rho c$ to $0.6\,\rho c$, and the acoustic resistance of the outer central panel portion lies in the range $1\,\rho c$ to $2.5\,\rho c$.

Advantageously, the inner and outer panels have respective upstream and downstream end portions disposed at opposite ends of the respective central portions, the central portions of the panels each comprising an upstream part and a downstream part.

Under such circumstances, the ratio of the acoustic resistance of the upstream end portion of the outer panel to the acoustic resistance of the upstream end portion of the inner panel may lie in the range 1.5 to 3, and the ratio of the acoustic resistance of the downstream end portion of the outer panel to the acoustic resistance of the downstream end portion of the inner panel may also lie in the range 1.5 to 3.

Still under such circumstances, the ratio of the acoustic resistance of the upstream part of the central portion of the outer panel to the acoustic resistance of the upstream end portion of the outer panel may lie in the range 1.2 to 2; the ratio of the acoustic resistance of the upstream part of the central portion of the outer panel to the acoustic resistance of the downstream part of the central portion of the outer panel may lie in the range 0.4 to 2.5; and the ratio of the acoustic resistance of the upstream part of the central portion of the outer panel to the acoustic resistance of the downstream end portion of the outer panel may lie in the range 1.2 to 2.

Likewise, the ratio of the acoustic resistance of the upstream part of the central portion of the inner panel to the acoustic resistance of the upstream end portion of the inner panel may lie in the range 0.5 to 1; the ratio of the acoustic resistance of the upstream part of the central portion of the inner panel to the acoustic resistance of the downstream part of the central portion of the inner panel may lie in the range 0.5 to 1.5; and the ratio of the acoustic resistance of the upstream part of the central portion of the inner panel to the acoustic resistance of the downstream end portion of the inner panel may lie in the range 0.5 to 1.

The acoustic resistance of the end portions of the outer panel may lie in the range $1\,\rho c$ to $1.8\,\rho c$ and the acoustic resistance of the end portions of the inner panel may lie in the range $0.5\,\rho c$ to $1\,\rho c$.

Preferably, each of the inner and outer acoustic treatment panels includes at least one cellular-structure core sandwiched between a solid skin and a perforated skin, the central portion of the inner panel having a single layer, the end portions of the inner panel having a single layer or two layers, and the end and central portions of the outer panel having two layers.

The invention also provides a bypass turbojet including an acoustic treatment device.

BRIEF DESCRIPTION OF THE DRAWINGS

Other characteristics and advantages of the present invention can be seen from the following description made with reference to the accompanying drawings, which show an embodiment having no limiting character. In the figures:

FIG. 4 is a plot of curves showing the additional acoustic attenuation obtained by the acoustic treatment device of the invention.

DETAILED DESCRIPTION OF AN EMBODIMENT

Figure 1:
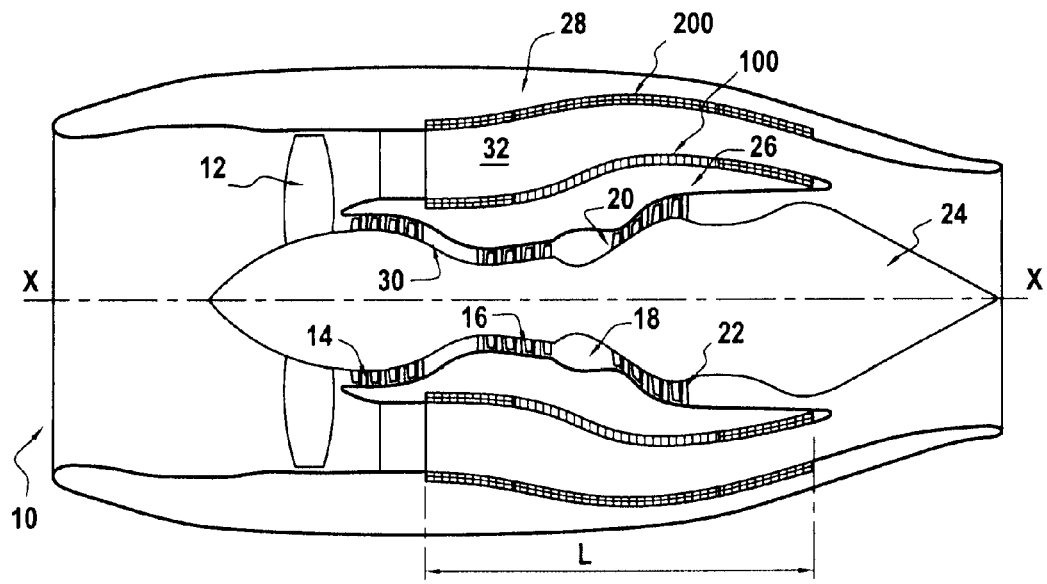
FIG. 1 is a diagrammatic longitudinal section view of a bypass turbojet fitted with an acoustic treatment device of the invention.

FIG. 1 shows an airplane turbojet 10 of the two-spool bypass type to which the invention applies in particular. Naturally, the invention also applies to other types of aircraft turbojet.

In known manner, going from upstream to downstream, the turbojet 10 comprises a fan 12, a low-pressure compressor 14, a high-pressure compressor 16, a combustion chamber 18, a high-pressure turbine 20, and a low-pressure turbine 22.

The turbojet 10 also includes an annular central core 24 centered on the longitudinal axis X-X of the turbojet, a primary cowl 26 surrounding the central body coaxially thereabout, and a secondary cover 28 surrounding the primary cowl, coaxially thereabout. The central core 24 and the primary cowl 26 define between them an annular channel 30 for passing a hot stream from the turbojet. Similarly, the primary and secondary cowls define between them an annular channel 32 for passing a cold stream from the turbojet, which channel is coaxial around the channel 30 for passing the hot stream.

On an outer surface, the primary cowl 26 is provided with an annular acoustic treatment panel 100 (referred to below as an inner panel). This inner panel 100 extends axially over a predetermined length L of the channel for passing the cold stream.

Similarly, on an inner surface, the secondary cowl 28 has an annular acoustic treatment panel 200 (referred to below as the outer panel) that is placed facing the inner panel 100 and that extends axially over the same length L.

By way of example, and as shown in FIG. 1, the length L over which the inner and outer panels extend may begin along the axis X-X at the outlet from the fan 12, and it may terminate at the downstream end of the primary cowl 26.

Figure 2:
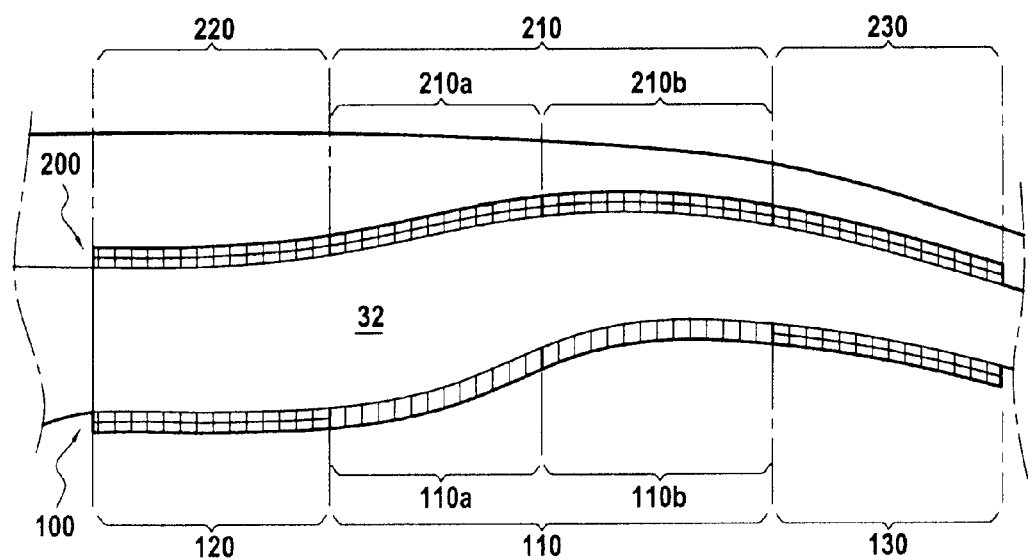
FIG. 2 is an enlargement of FIG. 1 showing the acoustic treatment device of the invention in greater detail.

As shown in FIG. 2, each of the inner and outer panels 100 and 200 includes a respective central panel portion 110 and 210. These central panel portions extend axially over a given predetermined length and they face each other.

The length of the central panel portions 110, 210 lies in the range ⅕ (one-fifth) to ⅘ (four-fifths) of the total length L of the panels. These portions are said to be "central" in the sense that the inner and outer panels also include respective upstream end portions 120 and 220, and respective downstream end portions 130 and 230, which end portions are located axially at opposite ends of the respective central portions.

By way of example, when the central portions 110, 210 extend over half the total length L of the panels, the end portions 120, 220, 130, and 230 may each extend over ¼ (one-fourth) of said length L. Naturally, other configurations could be envisaged.

According to the invention, the central portions 110, 210 of the panels present acoustic characteristics that are different from the acoustic characteristics of the end portions. More precisely, the invention provides for creating a large amount of asymmetry (in terms of acoustic resistance) between the central portion 110 of the inner panel 100 and the central portion 210 of the outer panel 200.

In well-known manner, the acoustic resistance of an acoustic treatment panel corresponds to the real part of the acoustic impedance of the panel. It represents the damping of the panel and its capacity for dissipating noise. This function is provided by the perforated skin(s) for a panel of the Helmholtz resonator type. It should be observed that the reactance, i.e. the imaginary part of the acoustic impedance of an acoustic treatment panel performs the role of setting the frequency of the damping via the thickness of the panel.

The intrinsic unit for acoustic impedance is the rayl, where 1 rayl=1 kilogram per second per square meter ($kg \cdot s^{-1} \cdot m^{-2}$). It is expressed herein as a multiple of the acoustic resistance of air at ambient temperature which is written ρc (where ρ is the density and c is the speed of sound of the ambient medium), and which is equivalent to about 420 rayls in the metric system of units.

The acoustic resistance of an acoustic treatment panel may be measured by various experimental devices and measurement techniques, and by methods that are themselves well known. By way of example, mention may be made of the measurement methods that operate on the principle of the Kundt tube or indeed the device that performs measurement by flow head loss and universally known as "direct current flow resistance measurement".

According to the invention, the ratio between the acoustic resistances of the central portions of the panel is not less than 2.

In a preferred embodiment of the invention, it is more precisely the ratio of the acoustic resistance $R_{OUT\text{-}CENTRAL}$ of the central portion 210 of the outer panel to the acoustic resistance $R_{IN\text{-}CENTRAL}$ of the central portion 110 of the inner panel that is greater than or equal to 2, and preferably less than or equal to 9, i.e.:

$$2 \leq R_{OUT\text{-}CENTRAL}/R_{IN\text{-}CENTRAL} \leq 9 \tag{1}$$

Naturally, it is possible to envisage the inverse ratio (i.e. $R_{IN\text{-}CENTRAL}/R_{OUT\text{-}CENTRAL}$) that is greater than or equal to 2. Nevertheless, that asymmetry gives results that are not so good in terms of increased acoustic attenuation.

Furthermore, it has been observed that an acoustic resistance $R_{IN\text{-}CENTRAL}$ for the central portion of the inner panel lying in the range 0.3 ρc to 0.6 ρc and an acoustic resistance $R_{OUT\text{-}CENTRAL}$ for the central portion of the outer panel lying in the range 1 ρc to 2.5 ρc are particularly advantageous for further increasing the acoustic attenuation obtained by the device of the invention.

Such acoustic resistances are particularly well adapted for obtaining effective attenuation of the fan noise during takeoff of the airplane.

Similarly, the ratio of the acoustic resistance $R_{OUT\text{-}UP}$ of the upstream end portion 220 of the outer panel to the acoustic resistance $R_{IN\text{-}UP}$ of the upstream end portion 120 of the inner panel advantageously lies in the range 1.5 to 3, i.e.

$$1.5 \leq R_{OUT\text{-}UP}/R_{IN\text{-}UP} \leq 3 \tag{2}$$

The ratio of the acoustic resistance $R_{OUT\text{-}DOWN}$ of the downstream end portion 230 of the outer panel to the acoustic resistance $R_{IN\text{-}DOWN}$ of the downstream end portion 130 of the inner panel likewise advantageously lies in the range 1.5 to 3, i.e.:

$$1.5 \leq R_{OUT\text{-}DOWN}/R_{IN\text{-}DOWN} \leq 3 \tag{3}$$

In other words, the end portions 220, 230 of the outer panel present greater acoustic resistance than the outer portions 120, 130 of the inner panel.

Finally, still advantageously, the acoustic resistances $R_{OUT-UP}$, $R_{OUT-DOWN}$ of the end portions 220, 230 of the outer panel lie in the range 1 ρc to 1.8 ρc and the acoustic resistances $R_{IN-UP}$ and $R_{IN-DOWN}$ of the end portions 120, 130 of the inner panel lie in the range 0.5 ρc to 1 ρc.

Furthermore, the respective central portions of the inner and outer panels may each be made up of an upstream part 110a, 210a and a downstream part 110b, 210b having acoustic characteristics that likewise differ between each other (within the limits of equation (1)).

Advantageously:
the ratio of the acoustic resistance $R_{OUT-CENTRAL-1}$ of the upstream part 210a of the central portion 210 of the outer panel 200 to the acoustic resistance $R_{OUT-UP}$ of the upstream end portion 220 of the outer panel lies in the range 0.6 to 2.5;
the ratio of the acoustic resistance $R_{OUT-CENTRAL-1}$ of the upstream part 210a of the central portion 210 of the outer panel 200 to the acoustic resistance $R_{OUT-CENTRAL-2}$ of the downstream part 210b of the central portion of the outer panel lies in the range 0.4 to 2.5; and
the ratio of the acoustic resistance $R_{OUT-CENTRAL-1}$ of the upstream part 210a of the central portion 210 of the outer panel to the acoustic resistance $R_{OUT-DOWN}$ of the downstream end portion 230 of the outer panel lies in the range 0.6 to 2.5.

In terms of equations, these characteristics can be written as follows:

$$0.6 \leq R_{OUT-CENTRAL-1}/R_{OUT-UP} \leq 2.5 \quad (4)$$

$$0.4 \leq R_{OUT-CENTRAL-1}/R_{OUT-CENTRAL-2} \leq 2.5 \quad (5)$$

$$0.6 \leq R_{OUT-CENTRAL-1}/R_{OUT-DOWN} 2.5 \quad (6)$$

On the same lines, for the inner panel, advantageously:
the ratio of the acoustic resistance $R_{IN-CENTRAL-1}$ of the upstream part 110a of the central portion 110 of the inner panel 100 to the acoustic resistance $R_{IN-UP}$ of the upstream end portion 120 of the inner panel lies in the range 0.4 to 1;
the ratio of the acoustic resistance $R_{IN-CENTRAL-1}$ of the upstream part 110a of the central portion 110 of the inner panel 100 to the acoustic resistance $R_{IN-CENTRAL-2}$ of the downstream part 110b of the central portion of the inner panel lies in the range 0.5 to 2; and
the ratio of the acoustic resistance $R_{IN-CENTRAL-1}$ of the upstream part 110a of the central portion 110 of the inner panel 100 to the acoustic resistance $R_{IN-DOWN}$ of the downstream end portion 130 of the inner panel lies in the range 0.4 to 1.

In terms of equations, these characteristics can be written as follows:

$$0.4 \leq R_{IN-CENTRAL-1}/R_{IN-UP} \leq 1 \quad (7)$$

$$0.5 \leq R_{IN-CENTRAL-1}/R_{IN-CENTRAL-2} \leq 2 \quad (8)$$

$$0.4 \leq R_{IN-CENTRAL-1}/R_{IN-DOWN} \leq 1 \quad (9)$$

Figure 3A:
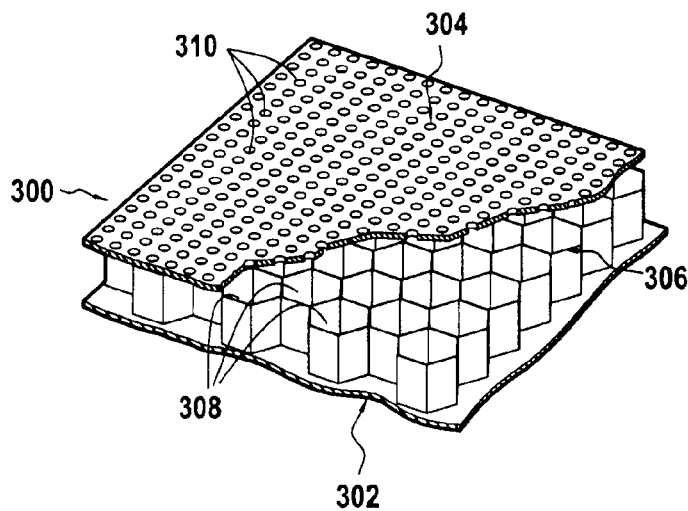
FIGS. 3A to 3C are diagrammatic views of acoustic treatment panels suitable for use in making the device of the invention.
Figure 3B:
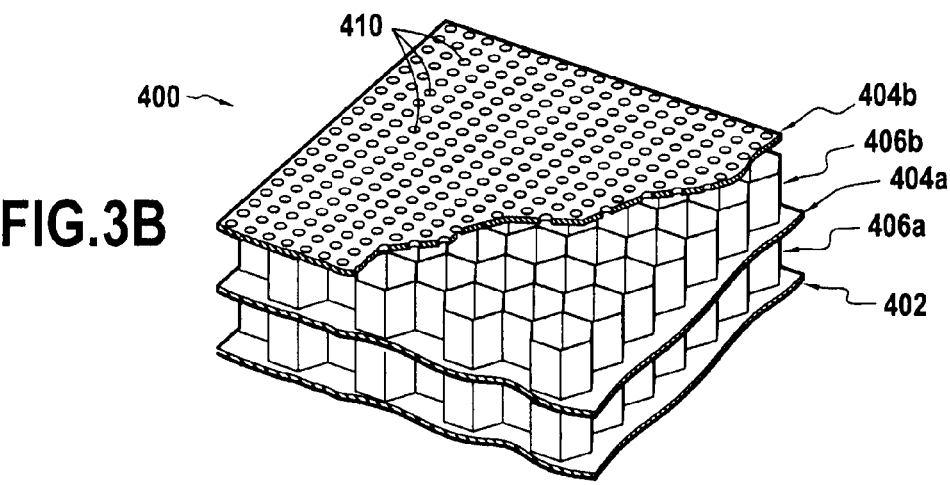
Figure 3C:
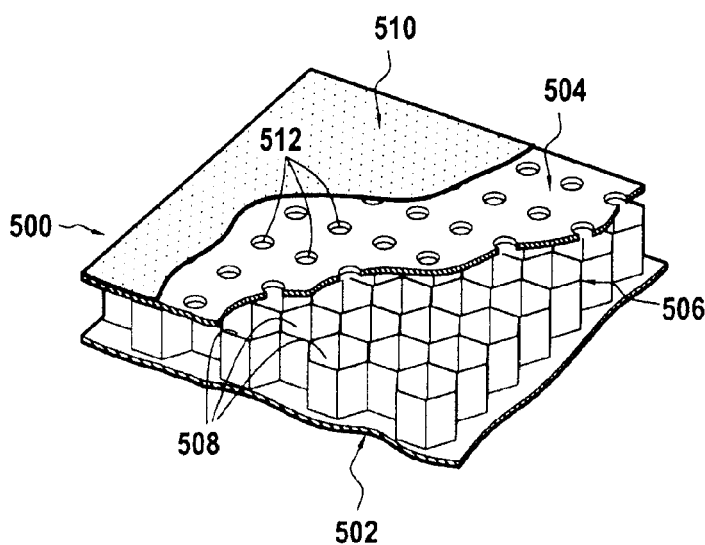

With reference to FIGS. 3A to 3C, there follows a more detailed description of the structure of the inner and outer acoustic treatment panels. In general, these panels are Helmholtz resonators of the single or double layer type that are quarter-wavelength tuned.

Typically, an acoustic treatment panel 300 having a single layer as shown in FIG. 3A has a single honeycomb-structure stage. The panel 300 comprises in particular a solid skin 302, a perforated skin 304, and a cellular-structure core 306 sandwiched between the skins.

The solid skin 302 serves as a support for the cellular structure 306. The cellular structure is fastened on the solid skin (by adhesive or by soldering, for example) and is constituted by an array of honeycomb-shaped cavities 308.

The perforated skin 304 is fastened to the cellular structure 306 (likewise by adhesive or by brazing) and in the context of the invention it is located beside the channel for passing the cold stream of the turbojet. This skin is perforated by a plurality of orifices 310.

The two-layer acoustic treatment panel 400 is as shown in FIG. 3B, and it comprises two honeycomb-structure stages. More precisely, it comprises a solid skin 402, first and second perforated skins 404a, 404b, a first cellular-structure core 406a sandwiched between the solid skin and the first perforated skin, and a second cellular-structure core 406b sandwiched between the two perforated skins. The second perforated skin 404b with its orifices 410 is located in the context of the invention beside the channel for passing the cold stream of the turbojet.

Finally, the acoustic treatment panel 500 shown in FIG. 3C is of the linear treatment type for a single layer resonator. It comprises a solid skin 502, a perforated skin 504, a cellular-structure core 506 constituted by an array of honeycomb-shaped cavities 508 sandwiched between these two skins, and a mesh structure 510 (cloth, lattice, or felt) arranged on the perforated skin beside the channel for passing the cold stream of the turbojet.

Compared with the panel of FIG. 3A, it can be seen that the orifices 512 in the perforated skin 504 are of greater diameter than the orifices in the perforated skin of the panel of FIG. 3A.

Advantageously, the central portion 110 (i.e. the upstream and downstream parts 110a and 110b) of the inner panel 100 is of the single layer type (i.e. as shown in FIG. 3A), while the end portions 120 and 130 of the inner panel are of the single layer or two-layer type, and the end portions 220, 230 and the central portion 210 (i.e. the upstream and downstream parts 210a and 210b) of the outer panel 200 are of the two-layer type (i.e. as shown in FIG. 3B).

Furthermore, as mentioned above, the perforated skin of an acoustic treatment panel provides the essential contribution in terms of acoustic resistance. The acoustic resistance is defined by three parameters of which the most influential is the perforation ratio, i.e. the percentage of the perforated area relative to the total area. The other parameters, of lesser influence, are the thickness of the skin and the diameter of the perforations.

Thus, using acoustic impedance models, it is possible on the basis of the above-defined acoustic resistance values to obtain recommendations for the perforation ratios of the perforated skins in the various portions of the panels of the acoustic treatment panel of the invention.

Perforated skin acoustic impedance models are also highly dependent on the characteristics of the flow and the sound level at the walls of the passage. The acoustic resistance value of the perforated skin is thus associated firstly with its perforation ratio and with the Mach number of the flow in a test passage.

Nevertheless, it should be observed that these models do not relate to panels of the linear treatment type, such as the panels shown in FIG. 3C.

Using such acoustic impedance models, it has been calculated that for single-layer inner and outer panels 100 and 200 (as shown in FIG. 3A), the panel characteristics shown below serve in particular to obtain an acoustic resistance ratio in accordance with the invention:

Inner Panel 100

$15\% \leq POA_{IN\text{-}CENTRAL} \leq 23\%$ $10\% \leq POA_{IN\text{-}END} \leq 17\%$ 0.8 millimeters (mm)≤to thickness of the perforated skins≤1.8 mm 0.3 mm≤to the diameter of the perforations in the perforated skin≤2 mm where $POA_{IN\text{-}CENTRAL}$ is the perforation ratio of the perforated skin of the central portion 110 expressed as a percentage of open area, and $POA_{IN\text{-}END}$ is the perforation ratio of the upstream and downstream end portions 120 and 130.

Outer Panel 200

$4\% \leq POA_{OUT\text{-}CENTRAL} \leq 10\%$ $7\% \leq POA_{OUT\text{-}END} \leq 14\%$ 0.8 mm≤to thickness of the perforated skins≤1.8 mm 0.3 mm≤to the diameter of the perforations in the perforated skin≤2 mm with $POA_{OUT\text{-}CENTRAL}$ for the perforation ratio of the perforated skin of the central portion 210, and $POA_{OUT\text{-}END}$ for the perforation ratio of the upstream and downstream end portions 220 and 230.

Similarly, for the two-layer inner and outer panels 100, 200 (as shown in FIG. 3B), acoustic impedance models have been used to calculate the following panel characteristics that make it possible in particular to obtain a ratio of acoustic resistances that is in compliance with the invention:

Inner Panel 100 for the perforated skin 404b:

$15\% \leq POA_{IN\text{-}CENTRAL} \leq 20\%$ 0.8 mm≤thickness of the perforated skins≤2 mm 0.8 mm≤diameter of the perforations of the perforated skins≤2 mm for the intermediate perforated skin 404a:

$1.5\% \leq POA_{IN\text{-}CENTRAL} \leq 3\%$ $2.5\% \leq POA_{IN\text{-}END} \leq 3.5\%$ 0.1 mm≤thickness of the perforated skins≤0.8 mm 0.1 mm≤diameter of the perforations of the perforated skins≤0.4 mm Outer Panel 200 for the perforated skin 404b:

$10\% \leq POA_{OUT\text{-}CENTRAL} \leq 18\%$ $15\% \leq POA_{OUT\text{-}END} \leq 20\%$ 0.8 mm≤thickness of the perforated skins≤2 mm 0.8 mm≤diameter of the perforations of the perforated skins≤2 mm for the intermediate perforated skin 404a:

$1.5\% \leq POA_{OUT\text{-}CENTRAL} \leq 3\%$ $2\% \leq POA_{OUT\text{-}END} \leq 3\%$ 0.1 mm≤thickness of the perforated skins≤0.8 mm 0.1 mm≤diameter of the perforations of the perforated skins≤0.4 mm.

The curves shown in FIG. 4 plot, for a target frequency $F_C$ (in hertz (Hz)), the increases in attenuation (δ decibels (dB)) obtained by an acoustic treatment device of the invention (curve 600), by an acoustic treatment device in which the inner and outer panels present acoustic resistance asymmetry that is identical over the entire length of the panels (curve 602), and by an acoustic treatment device in which the inner and outer panels do not present any asymmetry in terms of acoustic resistance (curve 604).

These curves show that compared with an acoustic treatment device that does not present any asymmetry between the inner and outer panels, the device of the invention makes it possible to achieve an improvement in acoustic attenuation at a target frequency of more than 40%.

These curves also show that an acoustic resistance asymmetry that is uniform over the entire length of the panels (curve 602) does not give rise to significant improvements in acoustic attenuation (the device of the invention still presents an improvement of 33% compared with such a device). In contrast, the association of a length for the central portions of the panels lying in the range ⅕ to ⅘ of the total length of the panels and a ratio between the acoustic resistances of the central portions of the panels of not less than 2 make it possible to obtain the looked-for increases in acoustic attenuation.

What is claimed is:

1. A device for acoustically treating the noise emitted by a bypass turbojet, the device comprising:

a primary cowl for surrounding a central core of the turbojet and including an inner annular acoustic treatment panel placed in an outer surface of the primary cowl; and a secondary cowl surrounding the primary cowl to cooperate therewith to define an annular channel for passing a cold flow from the turbojet, the secondary cowl including an outer annular acoustic treatment panel placed in an inner surface of the secondary cowl, the outer panel facing the inner panel and extending axially over a same length as the inner panel;

wherein each of the inner and outer panels are subdivided to include respective central panel portions facing each other and extending axially over a common predetermined length, a length of the central panel portions being in a range of one-fifth to four-fifths of a total length of the panels, and a ratio of an acoustic resistance of the central panel portion of the outer panel to an acoustic resistance of the central panel portion of the inner panel being asymmetric and not less than 2.

2. The device according to claim 1, wherein the ratio between the acoustic resistance of the central panel portion of the outer panel to the acoustic resistance of the central panel portion of the inner panel is in the range of 2 to 9.

3. The device according to claim 1, wherein the acoustic resistance of the central panel portion of the inner panel is in a range of 0.3 ρc to 0.6 ρc.

4. The device according to claim 1, wherein the acoustic resistance of the central panel portion of the outer panel is in a range of 1 ρc to 2.5 ρc.

5. The device according to claim 1, wherein the inner and outer panels are subdivided to include respective upstream and downstream end portions disposed at opposite ends of the respective central portions, the central portions of the panels each comprising an upstream part and a downstream part.

6. The device according to claim 5, wherein a ratio of an acoustic resistance of the upstream end portion of the outer panel to an acoustic resistance of the upstream end portion of the inner panel is in a range of 1.5 to 3.

7. The device according to claim 5, wherein a ratio of an acoustic resistance of the downstream end portion of the outer panel to an acoustic resistance of the downstream end portion of the inner panel is in a range of 1.5 to 3.

8. The device according to claim 5, wherein:

a ratio of an acoustic resistance of the upstream part of the central panel portion of the outer panel to an acoustic resistance of the upstream end portion of the outer panel is in a range of 0.6 to 2.5;

a ratio of the acoustic resistance of the upstream part of the central panel portion of the outer panel to an acoustic resistance of the downstream part of the central panel portion of the outer panel is in a range of 0.4 to 2.5; and a ratio of the acoustic resistance of the upstream part of the central panel portion of the outer panel to an acoustic resistance of the downstream end portion of the outer panel is in a range of 0.6 to 2.5.

9. The device according to claim 5, wherein:
a ratio of an acoustic resistance of the upstream part of the central panel portion of the inner panel to an acoustic resistance of the upstream end portion of the inner panel is in a range of 0.4 to 1;
a ratio of the acoustic resistance of the upstream part of the central panel portion of the inner panel to an acoustic resistance of the downstream part of the central panel portion of the inner panel is in a range of 0.5 to 2; and
a ratio of the acoustic resistance of the upstream part of the central panel portion of the inner panel to an acoustic resistance of the downstream end portion of the inner panel is in a range of 0.4 to 1.

10. The device according to claim 5, wherein an acoustic resistance of the end portions of the outer panel is in a range of 1 $\rho c$ to 1.8 $\rho c$.

11. The device according to claim 5, wherein an acoustic resistance of the end portions of the inner panel is in a range of 0.5 $\rho c$ to 1 $\rho c$.

12. The device according to claim 5, wherein each of the inner and outer acoustic treatment panels includes at least one cellular-structure core sandwiched between a solid skin and a perforated skin, the central panel portion of the inner panel having a single layer, the end portions of the inner panel having a single layer or two layers, and the end and central panel portions of the outer panel having two layers.

13. A bypass turbojet including an acoustic treatment device according to claim 1.

* * * * *